United States Patent [19]
Saito et al.

[11] Patent Number: 5,666,568
[45] Date of Patent: Sep. 9, 1997

[54] CAMERA

[75] Inventors: Tatsuo Saito; Shigenori Goto, both of Saitama, Japan

[73] Assignee: Fuji Photo Optical Co., Ltd., Saitama, Japan

[21] Appl. No.: 727,005

[22] Filed: Oct. 8, 1996

[30] Foreign Application Priority Data

Oct. 13, 1995 [JP] Japan ................... 7-265739

[51] Int. Cl.$^6$ ............... G03B 13/36; G03B 17/00
[52] U.S. Cl. .................. 396/100; 396/448
[58] Field of Search .................. 396/100, 448

[56] References Cited

U.S. PATENT DOCUMENTS 4,349,266  9/1982  Maeda et al. .................. 396/448
5,309,195  5/1994  Goo et al. .................... 396/302

*Primary Examiner*—Russell E. Adams
*Attorney, Agent, or Firm*—Leydig, Voit & Mayer

[57] ABSTRACT

A lens cap in a camera is shaped so as to cover a distance measuring optical system when it is mounted on a taking lens. A photodiode array as a light receiving element for measurement of distance is utilized to obtain a luminance level of the light incident thereto, and it is compared with a luminance level obtained through a light receiving element for photometry. If a difference between the two luminance levels is large, a predetermined cap alarm process is carried out as determining that the lens cap is mounted on the taking lens. Thus, photography is surely prevented in a mounting state of the lens cap.

5 Claims, 5 Drawing Sheets

CAMERA

BACKGROUND OF THE INVENTION

1. Field of the Invention

The present invention relates to a camera, and more particularly, to a camera having both a photographing optical system and a finder optical system.

2. Related Background Art

Conventional cameras widely used include those provided with a photographing optical system and a finder optical system for visually checking a range of a picture plane. With the cameras of this type, a photographer cannot check whether a lens cap for protection is set on a taking lens or not, simply by looking in the finder. This often caused the photographer to carry out photography with the lens cap still being mounted on the taking lens, thus resulting in failing to take an expected photograph.

An idea for solving it is a structure to cover the finder by the lens cap when the lens cap is mounted on the taking lens. The taking lens and the finder, however, were often located at positions relatively apart from each other, and thus, a very large lens cap was necessary to cover the finder or such a structure was sometimes impossible in terms of the position.

SUMMARY OF THE INVENTION

The present invention has been accomplished to solve the above problem, and an object of the invention is to provide a camera having a photographing optical system and a finder optical system provided with a mechanism capable of surely preventing photography while the lens cap is mounted on the finder.

An aspect of the invention is a camera having a photographing optical system and a finder optical system for indicating a range of a picture plane, comprising:

distance measuring means of a passive method, having a first light receiving portion provided with a photosensor array, for measuring a distance to a subject, based on a phase difference between two optical images obtained by the first light receiving portion;

photometry means, having a second light receiving portion for detecting light incident thereto, for determining a luminance of the external field, based on a detection result of the second light receiving portion;

comparing means for comparing a luminance level obtained from a detection result by the first light receiving portion with a luminance level obtained by the second light receiving portion; and determining means for determining that a lens cap is mounted on a taking lens when a result of comparison by the comparing means is that a difference between the two luminance levels is greater than a predetermined level.

Normally, the photosensor array of the first light receiving portion used for measurement of distance detects the phase difference between the two optical images detected. It is, however, also possible to detect an output from each photosensor and convert it into the intensity of light detected. The camera according to the present invention is thus arranged in such a manner that a luminance level is obtained from the detection data of the photosensor array used in the distance measuring means and that the determination that the lens cap is mounted on the taking lens is made when the difference of the foregoing luminance level from the luminance level detected by the photometry means is greater than the predetermined level.

The shape of the lens cap mounted on the taking lens of such a camera is determined so as to cover the first light receiving portion of the distance measuring means or the second light receiving portion of the photometry means when the lens cap is mounted on the taking lens.

Another aspect of the invention is a camera having a photographing optical system and a finder optical system for indicating a range of a picture plane, comprising:

distance measuring means of a passive method, having photosensor arrays corresponding to two distance measuring optical systems, for measuring a distance to a subject, based on a phase difference between two optical images obtained by the photosensor arrays;

comparing means for comparing luminance levels obtained from detection results of the respective photosensor arrays with each other; and determining means for determining that a lens cap is mounted on a taking lens when a result of comparison by the comparing means is that a difference between the two luminance levels is greater than a predetermined level.

The distance measurement method of this camera is the passive method with two distance measuring optical systems, for each of which a photosensor array is provided. Then two luminance levels are obtained from detection data of the respective photosensor arrays, and the determination that the lens cap is mounted on the taking lens is made when the difference between the two luminance levels is greater than the predetermined level.

The shape of the lens cap mounted on the taking lens of this camera is determined so as to cover either one of the two distance measuring optical systems when the lens cap is mounted on the taking lens.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The embodiments of the present invention will be explained with reference to the accompanying drawings.

Figure 1:
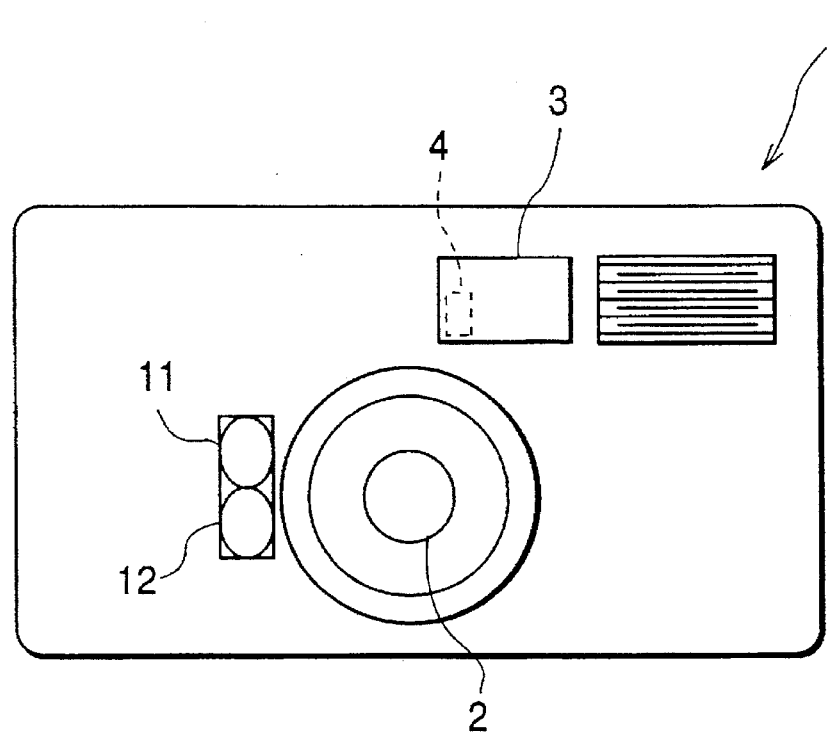
FIG. 1 is a front view to show a camera according to an embodiment of the present invention.

FIG. 1 shows the appearance of the camera according to an embodiment of the present invention. This camera 1 has the finder 3 separate from the taking lens 2, and the photographer checks the range of the picture plane as looking in the finder. The distance measuring device of the passive method is adopted as a distance measuring device for detecting the distance to the subject, and two optical systems 11, 12 being the light receiving portions thereof are set near the taking lens 2. There is a light receiving element 4 of CdS or the like for detecting the luminance of the subject, inside the finder 3.

Figure 2:
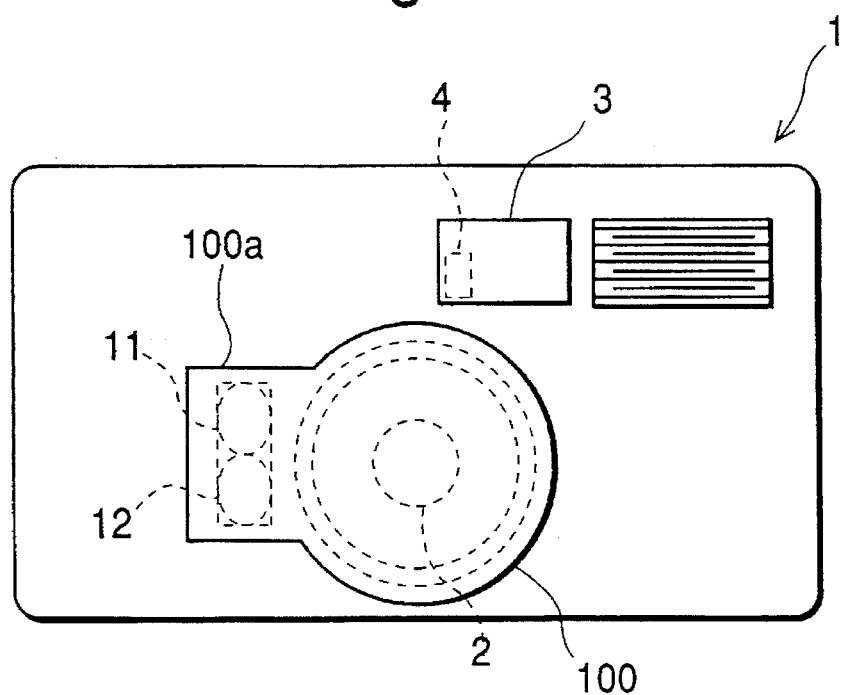
FIG. 2 is a front view to show a state of the lens cap mounted in the camera of FIG. 1.

FIG. 2 shows a state of the lens cap 100 for protection being mounted on the taking lens 2. This lens cap 100 has the shape to cover the optical systems 11, 12 of the distance measuring device, as illustrated, when the lens cap 100 is mounted on the taking lens 2. A projecting portion 100a of the lens cap 100 is located above the optical systems 11, 12.

Figure 3:
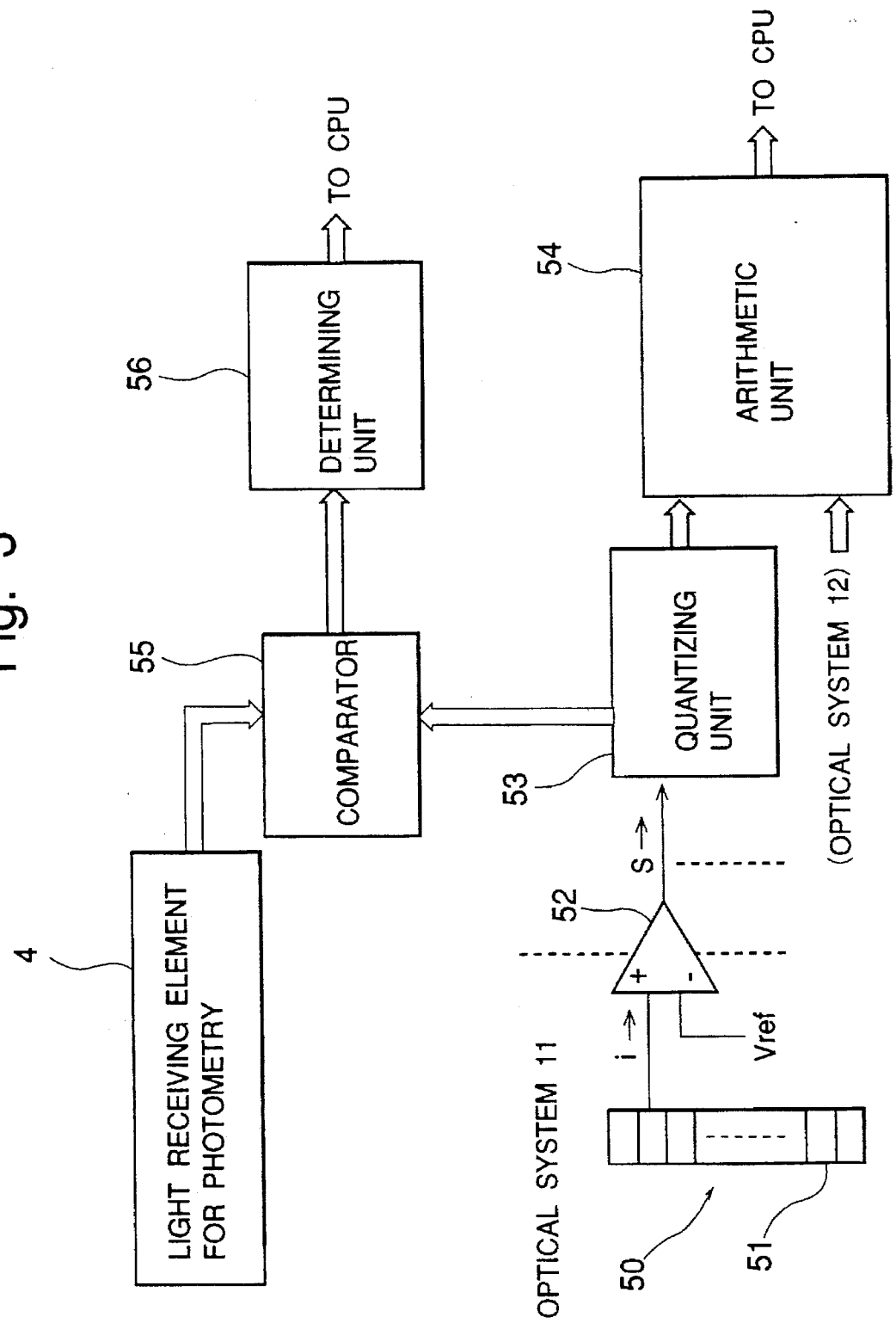
FIG. 3 is a block diagram to schematically show the construction of the distance measuring device of the passive method.

Here, the structure of the distance measuring device of the passive method is specifically shown in FIG. 3. Reflected light from the subject is guided to the two optical systems 11, 12 to form images on photodiode arrays 50 provided corresponding to the respective optical systems 11, 12. It is noted that the photodiode array for the optical system 12 is omitted in the illustration. Each of photodiodes 51 constituting the photodiode array 50 outputs an electric current according to the intensity of the light received. This electric current is integrated to a junction capacitance of photodiode 51 and its integral value is output as a signal i. Each photodiode 51 is provided with a corresponding comparator 52, and the output signal i from each photodiode 51 is supplied to the comparator 52, in which the output signal i is compared with a reference voltage $V_{ref}$. The comparator 52 outputs a signal S when the level of the output signal i comes to exceed the level of the reference voltage $V_{ref}$. This signal S is supplied to a quantizing unit 53.

The quantizing unit 53 detects a response time of the signal S supplied from each photodiode 51. Since the response time of the signal S is a time elapsing before the level of the signal i as an integral value reaches the reference voltage $V_{ref}$, the intensity of the light received by the photodiode 51 is converted into a period of the response time of this signal S. The response time of this signal S is measured by counting clocks output from a CPU set in the camera body. An optical image corresponding to the light received by the light receiving portion is obtained from the response times of signals S output from the respective photodiodes 51 in this manner. An arithmetic unit 54 calculates the distance to the subject from a phase difference between two optical images obtained through the two optical systems 11, 12. The distance measuring device of the passive method obtains a distance measurement value in this manner. The optical system 12 also has the same structure of from the photodiode array to the quantizing unit, which is omitted in the illustration of FIG. 3.

The quantizing unit 53 also converts the response time of signal S into a luminance of the subject and supplies a level of the luminance obtained to a comparing unit 55. Further, the comparing unit 55 receives a detection result of the light receiving element 4 for photometry detecting the luminance of the subject, and the comparing unit 55 compares the luminance level supplied from the quantizing unit 53 with the luminance level obtained through the light receiving element 4 for photometry.

A result of this comparison is supplied to a determining unit 56, which determines whether a difference between the luminance levels compared is not more than a reference level set (for example, Lv4). When the difference between the luminance levels compared is over the reference level set, the determining unit 56 makes the determination that the lens cap is mounted on the taking lens. The result is supplied to the CPU, which executes a predetermined cap alarm process, for example, a process of lighting an LED for alarm, as described hereinafter.

Figure 4:
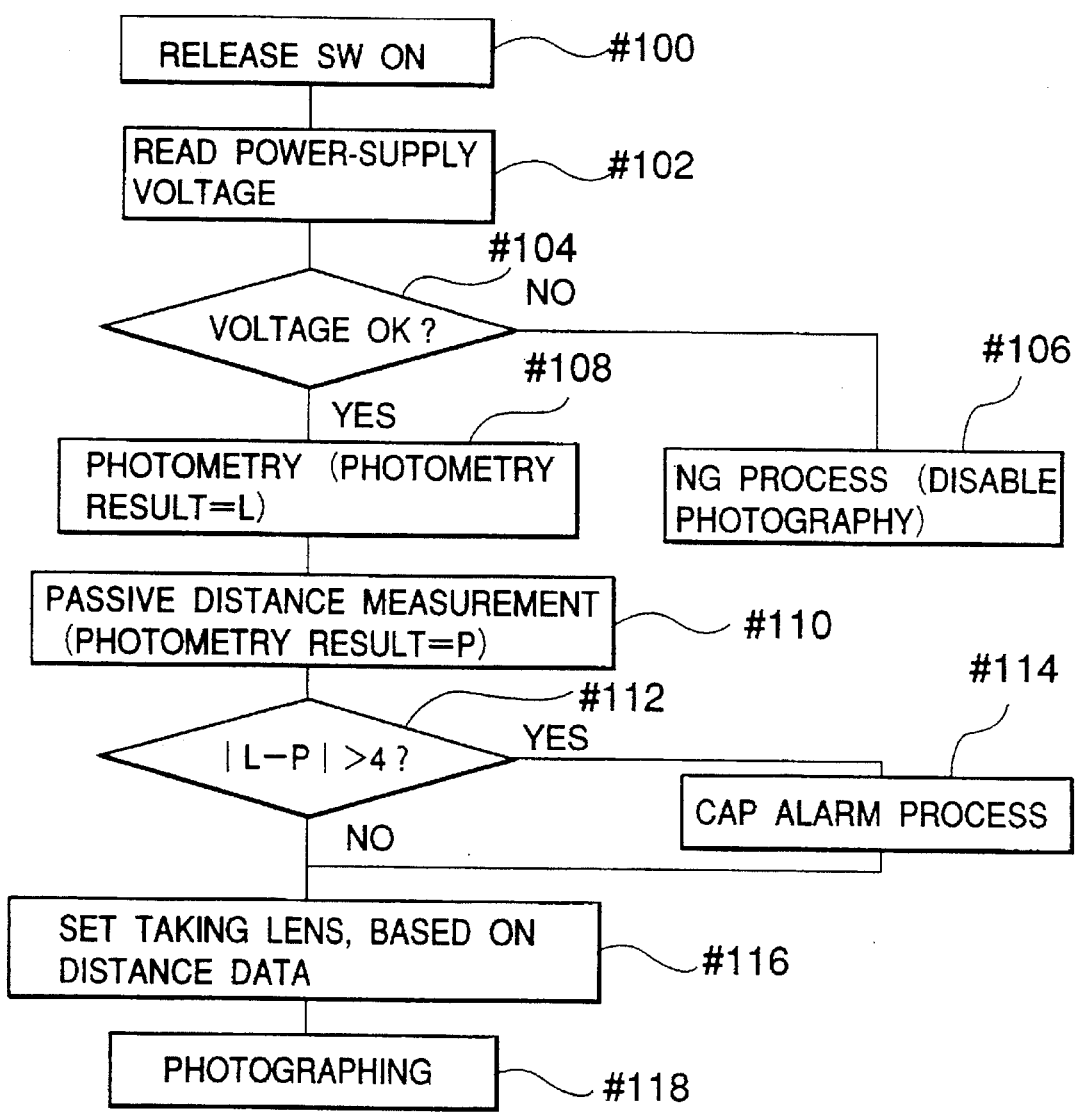
FIG. 4 is a flowchart to show the operation of the camera according to an embodiment of the present invention.

The operation of this camera is next explained with reference to the flowchart of FIG. 4.

When the release switch is turned on with the camera being directed to the subject (#100), the power-supply voltage is read to check the voltage value (#102, #104). When the voltage value thus read is below a threshold value (if "No" at #104), photographing is impossible and the flow proceeds to a predetermined NG process, for example a process of generating an indication or an alarm sound or the like to a user to indicate incapability of photographing (#106).

If the voltage value read is over the threshold value ("Yes" at #104), the photometry process is carried out based on the data detected by the light receiving element 4 for photometry (#108). At the same time, the distance measurement process of the passive method is also carried out based on the data detected by the photodiode arrays provided corresponding to the optical systems 11, 12, and during this distance measurement process, the luminance level is also obtained from the response times of signals S as discussed above (#110).

Next, the photometry result L obtained by the photometry process is compared with the photometry result P obtained in the passive distance measurement, and it is determined whether a difference between the two photometry results is not more than Lv4 determined as a reference luminance level (#112). The two photometry results are nearly equal to each other in the normal condition, but if the lens cap 100 is mounted on the lens-barrel portion of the taking lens 2, as shown in FIG. 2, the values of the two photometry results become greatly different from each other because the projecting portion 100a of the lens cap 100 covers the optical systems 11, 12. Therefore, if the difference between the two photometry results is greater than, for example, Lv4 ("Yes" at #112), the predetermined cap alarm process is carried out as determining that the lens cap 100 is mounted on the taking lens 2 (#114).

Figure 5:
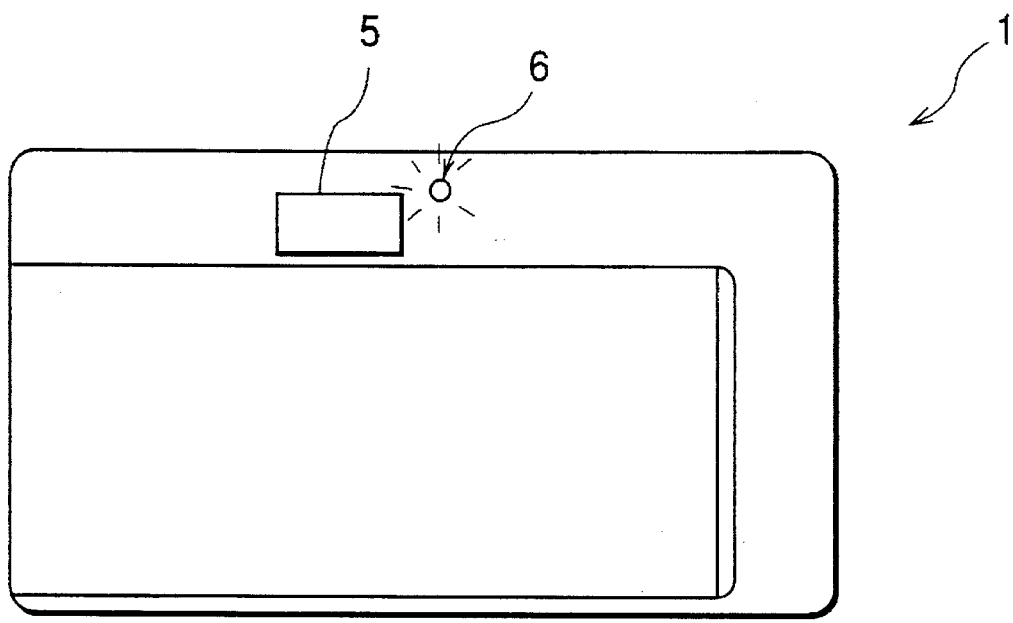
FIG. 5 is a back view of the camera shown in FIG. 1.

An example of this alarm process executed herein is a process to light an alarming LED 6 provided near the finder window 5 on the back face of camera, as shown in FIG. 5, thereby notifying the photographer that the lens cap is mounted on the taking lens. Another example of the alarm process is execution of a process to inhibit photography itself.

On the other hand, if the difference between the two photometry results is not more than, for example, Lv4 ("No" at #112), the determination that the lens cap 100 is removed is made, and the taking lens is set based on the distance measurement data obtained at #110 (#116), then proceeding to the normal photographing process (#118).

Figure 6:
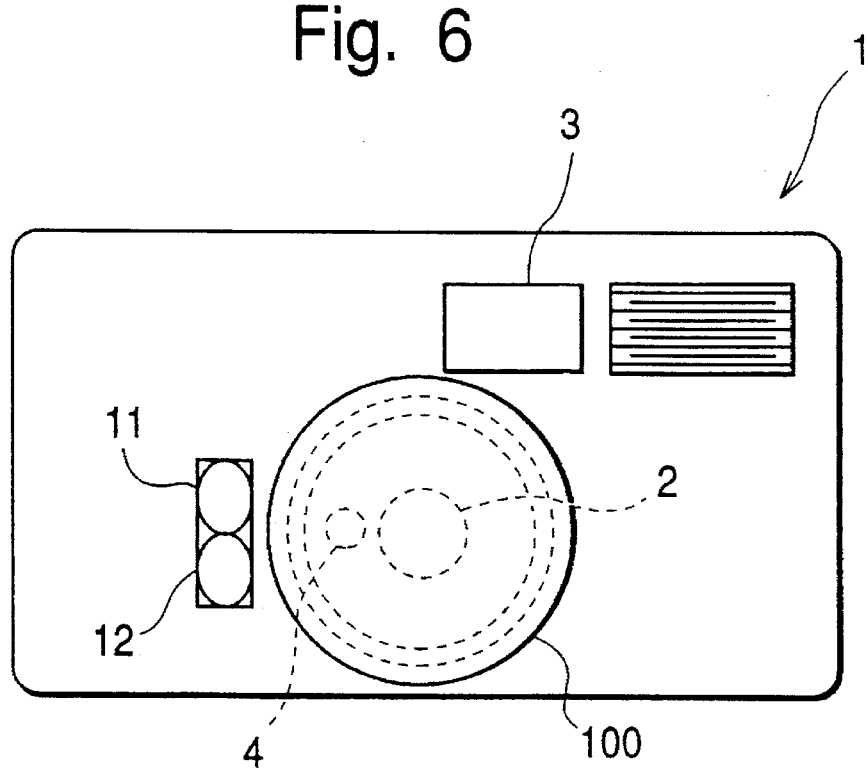
FIG. 6 is a front view to show a camera according to another embodiment of the present invention.

This embodiment exemplifies the type in which the lens cap 100 covers the optical systems 11, 12 of the distance measurement device, but, conversely, the invention can also be applied to another type to cover the light receiving element 4 for photometry by the lens cap 100. Also in this case, the two results of photometry executed in #108 to #112 described above are greatly different from each other, and the same flow as that of FIG. 4 is applied. The structure of camera 1 in this case may be of a type in which the light receiving element 4 for photometry is set inside the lens barrel of the taking lens 2, as shown in FIG. 6. When the lens cap 100 is mounted on the lens barrel portion, the lens cap 100 covers the light receiving element 4.

Figure 7:
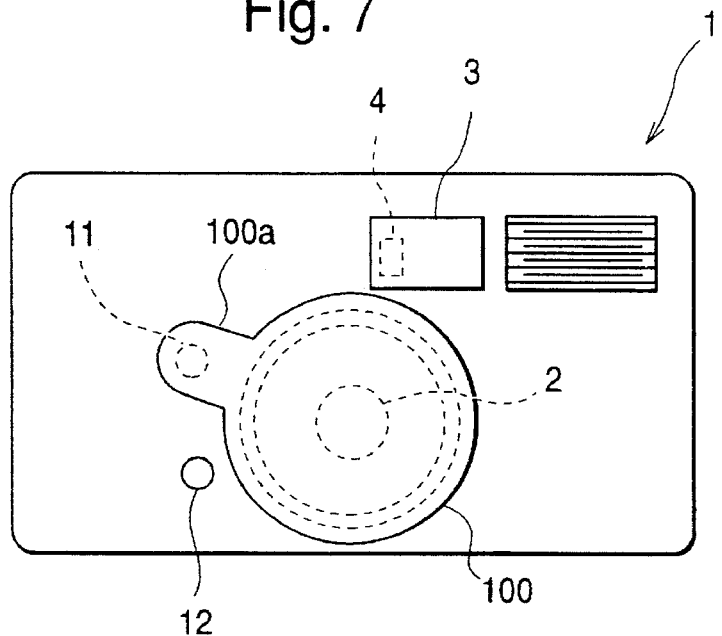
FIG. 7 is a front view of a camera according to still another embodiment of the present invention.
Figure 8:
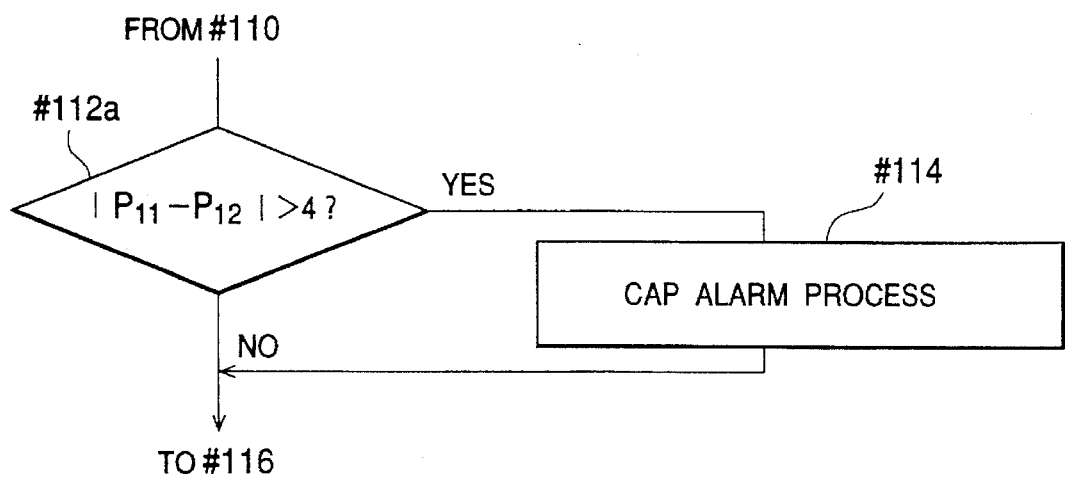
FIG. 8 is a partial flowchart to show the operation of the camera shown in FIG. 7.

Further, another embodiment of the present invention is shown in FIG. 7. This embodiment is constructed in such structure that the projecting portion 100a of the lens cap 100 covers one optical system 11 of the two optical systems 11, 12 for passive distance measurement. In the case of this structure, when the passive distance measurement is carried out at #110 in the flowchart of FIG. 4, the values of the two luminance levels detected through the optical system 11 and the optical system 12 become greatly different from each other. Thus, the photometry result $P_{11}$ on the optical system 11 side and the photometry result $P_{12}$ on the optical system 12 side, obtained during the period of executing the distance measurement process, are compared with each other. Then, it is determined whether the difference between the two photometry results $P_{11}$ and $P_{12}$ is not more than Lv4 (#112a), as shown in FIG. 8. If the difference between the two photometry results is greater than Lv4 ("Yes" at #112a), the cap alarm process as discussed above is carried out as making the determination that the lens cap 100 is mounted on the taking lens 2 (#114). On the other hand, if the difference between the two photometry results $P_{11}$ and $P_{12}$ is not more than Lv4 ("No" at #112a), the taking lens is set based on the distance measurement data obtained at #110 as making the determination that the lens cap 100 is removed (#116), then proceeding to the normal photographing process (#118). It is noted here that FIG. 8 shows only a part different from the flow of FIG. 4.

As explained above, in the case of the camera provided with the finder optical system separate from the photographing optical system, the photographer cannot check whether the lens cap is mounted on the taking lens or not, simply by looking in the finder. In contrast, the camera of the present invention is arranged in such a manner that the comparing means compares the difference between the luminance level obtained through the distance measuring means with the luminance level obtained through the photometry means and that the determining means is provided to determine that the lens cap is mounted, if the difference between the two luminance levels is large. Therefore, use of the determination result of this determining means enables sure prevention of photography in the mounting state of the lens cap, which the conventional cameras failed. In addition, since the mounting state of the lens cap is determined utilizing the detection results of the distance measurement means and the photometry means, there is no need to use a special device for detecting mounting of the lens cap, thus causing no increase of cost.

Further, the camera of the present invention is arranged in such a manner that the comparing means compares the luminance levels each obtained from the two distance measuring optical systems provided in the distance measuring means of the passive method with each other and that the determining means is provided to determine whether the difference between the two luminance levels is greater than the predetermined level. Therefore, use of the determination result of this determining means enables sure prevention of photography in the mounting state of the lens cap, similarly as in the above case. Since the mounting state of the lens cap is determined utilizing the detection results of the distance measuring means, there is no need to use a special device for detecting mounting of the lens cap, thus causing no increase of cost.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 265739/1995 filed on Oct. 13, 1995 is hereby incorporated by reference.

What is claimed is:

1. A camera having a photographing optical system and a finder optical system for indicating a range of a picture plane, comprising:

distance measuring means of a passive method, having a first light receiving portion provided with a photosensor array, for measuring a distance to a subject, based on a phase difference between two optical images obtained by the first light receiving portion;

photometry means, having a second light receiving portion for detecting light incident thereto, for determining a luminance of the external field, based on a detection result of the second light receiving portion;

comparing means for comparing a luminance level obtained from a detection result by said first light receiving portion with a luminance level obtained by said second light receiving portion; and determining means for determining that a lens cap is mounted on a taking lens when a result of comparison by said comparing means is that a difference between said two luminance levels is greater than a predetermined level.

2. The camera according to claim 1, wherein said lens cap has a shape to cover the first light receiving portion of said distance measuring means when said lens cap is mounted on said taking lens.

3. The camera according to claim 1, wherein said lens cap has a shape to cover the second light receiving portion of said photometry means when said lens cap is mounted on said taking lens.

4. A camera having a photographing optical system and a finder optical system for indicating a range of a picture plane, comprising:

distance measuring means of a passive method, having photosensor arrays corresponding to two distance measuring optical systems, for measuring a distance to a subject, based on a phase difference between two optical images obtained by said photosensor arrays;

comparing means for comparing luminance levels obtained from detection results of said respective photosensor arrays with each other; and determining means for determining that a lens cap is mounted on a taking lens when a result of comparison by said comparing means is that a difference between said two luminance levels is greater than a predetermined level.

5. The camera according to claim 4, wherein said lens cap has a shape to cover either one distance measuring optical system of said two distance measuring optical systems when said lens cap is mounted on said taking lens.

* * * * *